United States Patent
Chim et al.

(10) Patent No.: US 10,363,904 B1
(45) Date of Patent: Jul. 30, 2019

(54) SYSTEM AND METHOD TO DETECT TELEMATICS UNIT DISCONNECTION

(71) Applicant: GM GLOBAL TECHNOLOGY OPERATIONS LLC, Detroit, MI (US)

(72) Inventors: Huong T. Chim, Royal Oak, MI (US); Matt Neely, Rochester, MI (US); Matthew E. Gilbert-Eyres, Rochester, MI (US); Eric T. Hosey, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/055,496

(22) Filed: Aug. 6, 2018

(51) Int. Cl.
| | |
|---|---|
| *B60R 25/34* | (2013.01) |
| *B60R 25/33* | (2013.01) |
| *B60R 25/102* | (2013.01) |
| *G08B 25/01* | (2006.01) |
| *G08B 13/14* | (2006.01) |
| *G08B 25/00* | (2006.01) |
| *H04K 3/00* | (2006.01) |

(52) U.S. Cl.
CPC ............ *B60R 25/34* (2013.01); *B60R 25/102* (2013.01); *B60R 25/33* (2013.01); *G08B 13/14* (2013.01); *G08B 13/1409* (2013.01); *G08B 13/1418* (2013.01); *G08B 25/00* (2013.01); *G08B 25/016* (2013.01); *H04K 3/88* (2013.01)

(58) Field of Classification Search
CPC ................ G08B 13/14; G08B 13/1409; G08B 13/1418; G08B 25/00; G08B 25/016; H04K 3/88
See application file for complete search history.

(56) References Cited

U.S. PATENT DOCUMENTS

| | | | | |
|---|---|---|---|---|
| 2011/0151795 A1* | 6/2011 | D'Avello | ............... | H04K 3/226 455/63.3 |
| 2012/0029758 A1* | 2/2012 | Proefke | .................. | G08G 1/205 701/31.4 |
| 2012/0286950 A1* | 11/2012 | Peariso | .............. | G08B 13/1427 340/539.1 |
| 2016/0323386 A1* | 11/2016 | Wideman | ................ | H04L 67/12 |

\* cited by examiner

*Primary Examiner* — Andrew W Bee (57) ABSTRACT

One general aspect includes a telematics unit including: a memory configured to include a program and a processor configured to execute the program, where the program enables the processor to: sense a disconnection event; in response to the disconnection event being sensed, gather telematics unit location data, transmit the location data to a remote facility, and transmit a theft alert to a remote facility.

12 Claims, 3 Drawing Sheets

SYSTEM AND METHOD TO DETECT TELEMATICS UNIT DISCONNECTION

INTRODUCTION

Vehicles are often stolen to have their parts salvaged. For criminals, salvaged vehicle telematics units are particularly sought after because of the resale value on the black market. Furthermore, when a vehicle includes a telematics unit wirelessly connected to remote parties, thieves tend to disconnect the telematics unit from the rest of the vehicle electronics (or completely take it out of the vehicle) while hot wiring the vehicle, to render the device unable to notify the authorities of this criminal activity and unable to track the vehicle's location after the vehicle has been taken from the scene of the crime. Accordingly, it is desirable to be able to provide the location of the telematics unit after the device has been unlawfully disconnected from the rest of the vehicle componentry as well as be able to provide a theft alert in hopes that recovery of the stolen vehicle and its telematics unit may be recovered. Furthermore, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a memory configured to include a program and a processor configured to execute the program, where the program enables the processor to: sense a disconnection event; and in response to the disconnection event being sensed, gather VSM location data. Other embodiments of this aspect include corresponding computer systems, apparatus, and computer programs recorded on one or more computer storage devices, each configured to perform the actions of the methods.

Implementations may include one or more of the following features. The system where the program further enables the processor to, in response to the disconnection event being sensed, transmit the location data to a remote facility. The system where the program further enables the processor to, in response to the disconnection event being sensed, transmit a theft alert to a remote facility. The system where the VSM is a telematics unit. The system where the disconnection event is the VSM being disconnected from a primary antenna. The system where the disconnection event is the VSM being disconnected from a communications bus; and where the program further enables the processor to: determine whether the VSM is disconnected from a vehicle power source; and gather location data in response to both the disconnection event being sensed and when it has been determined that the VSM is disconnected from the vehicle power source. The system where the program further enables the processor to transmit both the location data and a theft alert to a remote facility in response to both the disconnection event being sensed and when it has been determined that the VSM is disconnected from the vehicle power source. The system where: the disconnection event is the VSM being disconnected from a vehicle power source; and where the program further enables the processor to: determine whether the VSM is disconnected from a communications bus; and gather location data in response to both the disconnection event being sensed and when it has been determined that the VSM is disconnected from the communications bus. The system where the program further enables the processor to transmit both the location data and a theft alert to a remote facility in response to both the disconnection event being sensed and when it has been determined that the VSM is disconnected from the communications bus. Implementations of the described techniques may include hardware, a method or process, or computer software on a computer-accessible medium.

One general aspect includes a telematics unit including: a memory configured to include a program and a processor configured to execute the program, where the program enables the processor to: sense a disconnection event; in response to the disconnection event being sensed, gather telematics unit location data, transmit the location data to a remote facility, and transmit a theft alert to a remote facility. Other embodiments of this aspect include corresponding computer systems, apparatus, and computer programs recorded on one or more computer storage devices, each configured to perform the actions of the methods.

Implementations may include one or more of the following features. The telematics unit further including: a backup battery and backup antenna; where the location data and the theft alert are transmitted to the remote facility via the backup antenna; and where telematics power is provided after the disconnection event via the backup battery. The telematics unit where the disconnection event is the telematics unit being disconnected from a communications bus; and where the program further enables the processor to: determine whether the telematics unit is disconnected from a vehicle power source; and gather telematics unit location data, transmit the location data to a remote facility, and transmit a theft alert to the remote facility in response to both the disconnection event being sensed and when it has been determined that the telematics unit is disconnected from the vehicle power source. The telematics unit where the disconnection event is the telematics unit being disconnected from a vehicle power source; and where the program further enables the processor to: determine whether the telematics unit is disconnected from a communications bus; and gather telematics unit location data, transmit the location data to a remote facility, and transmit a theft alert to the remote facility in response to both the disconnection event being sensed and when it has been determined that the telematics unit is disconnected from the communications bus. Implementations of the described techniques may include hardware, a method or process, or computer software on a computer-accessible medium.

One general aspect includes a method to detect telematics unit removal, the method including: sensing, via a processor, a disconnection event; and in response to the disconnection event being sensed, via the processor, gathering telematics unit location data. Other embodiments of this aspect include corresponding computer systems, apparatus, and computer programs recorded on one or more computer storage devices, each configured to perform the actions of the methods.

Implementations may include one or more of the following features. The method further including, in response to the disconnection event being sensed, via the processor, transmitting the location data to a remote facility. The method further including, in response to the disconnection event being sensed, via the processor, transmitting a theft alert to a remote facility. The method where the disconnection event is a telematics unit being disconnected from a primary antenna. The method further including: where the disconnection event is a telematics unit being disconnected from a communications bus; and determining, via the processor, whether the telematics unit is disconnected from a vehicle power source; and gathering telematics unit location data, via the processor, in response to both the disconnection event being sensed and when the processor has determined that the telematics unit is disconnected from the vehicle power source. The method further including transmitting, via the processor, both the telematics location data and a theft alert to a remote facility in response to both the disconnection event being sensed and when the processor has been determined that the telematics unit is disconnected from the vehicle power source. The method where: the disconnection event is a telematics unit being disconnected from a vehicle power source; and determining, via the processor, whether the telematics unit is disconnected from a communications bus; and gathering telematics unit location data, via the processor, in response to both the disconnection event being sensed and when it has been determined that the telematics unit is disconnected from the communications bus. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
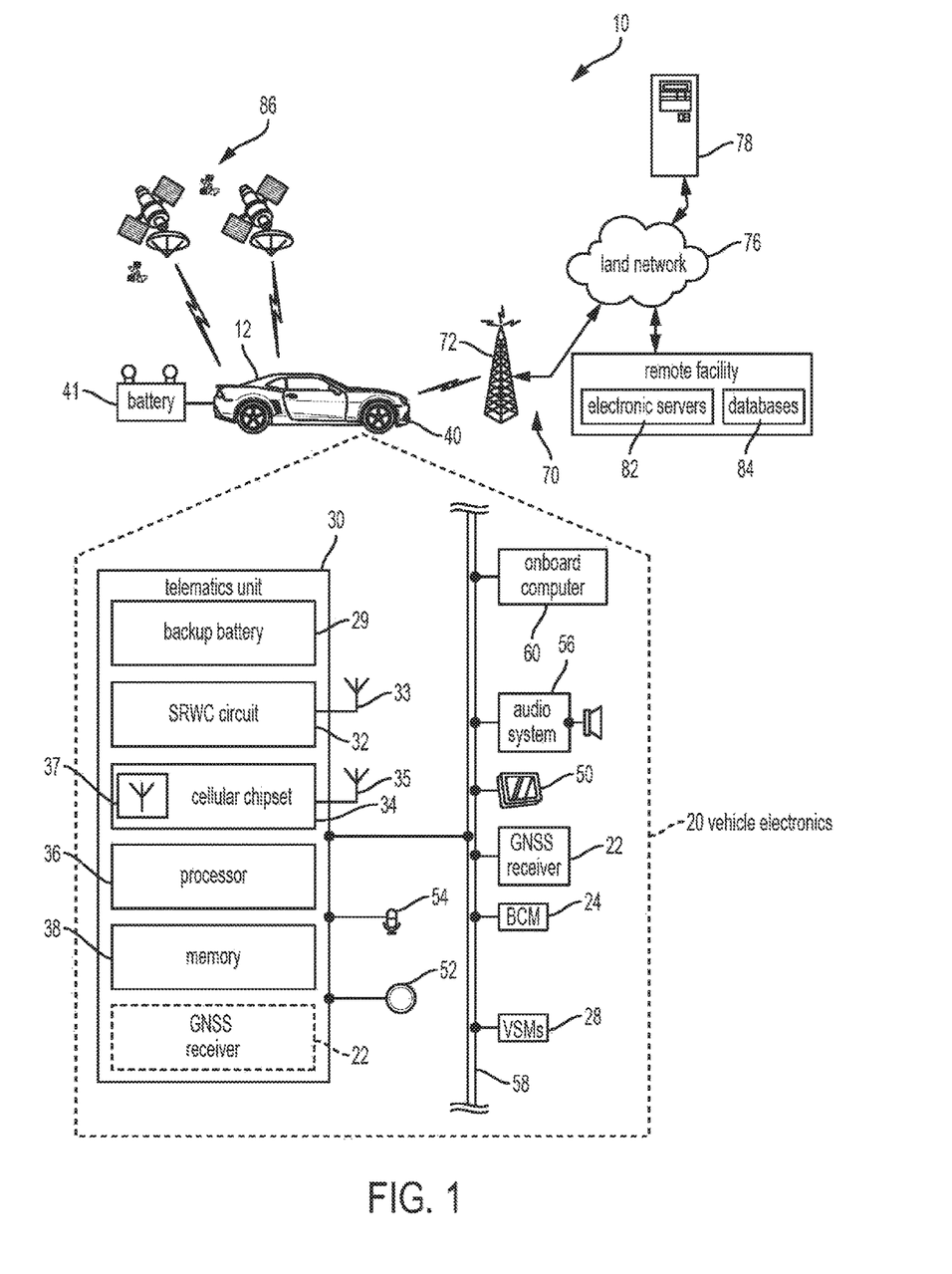
FIG. 1 is a block diagram depicting an embodiment of a communications system that is capable of utilizing the system and method disclosed herein, in accordance with exemplary embodiments.

With reference to FIG. 1, there is shown an operating environment that comprises a communications system 10 and that can be used to implement the method disclosed herein. Communications system 10 generally includes a vehicle 12 that includes vehicle electronics 20, a battery 41, one or more wireless carrier systems 70, a land communications network 76, a computer or server 78, a vehicle backend services facility 80, and a constellation of global navigation satellite system (GNSS) satellites 86. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally, in FIG. 1 and includes a global navigation satellite system (GNSS) receiver 22, a body control module or unit (BCM) 24, other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The main power source of vehicle 12 is the battery 41 which supplies electric power to all components of the vehicle 12 such as the vehicle electronics 20, as is generally known. Battery 41 may also be connected to vehicle bus 58 to communicate with one or more VSMs 28. For example, telematics unit 30 may receive one or more heartbeats from battery 41 to ensure a power source connection still exists.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSM, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with wireless device 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state, based on one or more onboard vehicle sensor readings, as discussed more below.

Telematics unit 30 is capable of communicating data via shortrange wireless communications (SRWC) through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the device 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, a backup battery 29, the SRWC circuit 32, the cellular chipset 34, a processor 36, memory 38, SRWC antenna 33, primary antenna 35, and internal backup antenna 37. The telematics unit 30 can be configured to communicate wirelessly according to one or more short-range wireless communications (SRWC) such as any of the Wi-Fi™, WiMAX™, Wi-Fi™ Direct, other IEEE 802.11 protocols, ZigBee™, Bluetooth™ Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80. And, in other embodiments, other protocols can be used for V2V or V2I communications. The short-range wireless communication (SRWC) circuitry 32 enables the telematics unit 30 to transmit and receive SRWC signals, such as BLE signals. The SRWC circuit can allow the device 30 to connect to another SRWC device. Additionally, in some embodiments, the telematics unit 30 contains a cellular chipset 34 thereby allowing the device to communicate via one or more cellular protocols, such as those used by cellular carrier system 70, through primary antenna 35 and backup antenna 37. In such a case, the telematics unit 30 is user equipment (UE) that can be used to in carry out cellular communications via cellular carrier system 70.

Primary antenna 35 is used for communications during the normal operations of the telematics unit 30 and is generally known to be located throughout vehicle 12 at one or more locations external to the telematics unit 30. Internal backup antenna 37 may be used to carry out communications in those instances that communications between cellular chipset 34 and primary antenna 35 have been severed (e.g., when the hardwiring between the chipset and antenna have been cut) or when telematics unit 30 has otherwise been disconnected/removed from the rest of the vehicle electronics 20 and/or battery 41. Backup antenna 37 (secondary antenna) is integrated into the telematics unit 30 and may be installed at a concealed location within the housing of the telematics unit 30. As shown, backup antenna 37 is located within cellular chipset 34; however, the backup antenna 37 may be installed anywhere within the confines of the telematics unit 30. In addition, backup antenna 37 may be hardwired directly to cellular chipset 34 or may be connected via one or more SRWC protocols. Backup battery 29 can be a rechargeable battery (e.g., a lithium-ion battery) integrated into the telematics unit 30 and is used to power the device when it has been disrupted or otherwise disconnected from the vehicle's main power source (i.e., battery 41). In one or more embodiments, the backup battery 29 may be installed at a concealed location within the housing of the telematics unit 30.

Telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or other display. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the remote facility 80 can store various information and can include a vehicle operation database that stores information regarding the operation of various vehicles (e.g., vehicle telemetry or sensor data). Also, the remote server 80 can receive can thus act to distribute software (and/or software updates) to the various vehicles including vehicle 12.

METHOD

Figure 2:
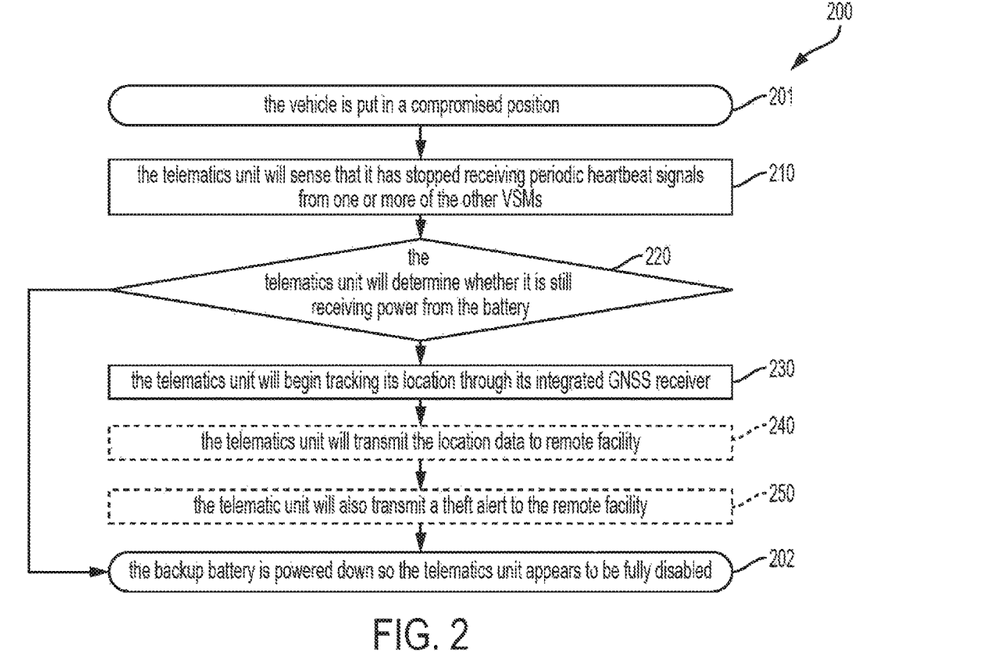
FIG. 2 is a flowchart of a process for detecting telematics unit removal, in accordance with exemplary embodiments.

Now turning to FIG. 2, there is shown an embodiment of a method 200 to detect an instance of telematics unit 30 disconnection for the purposes of indicating the occurrence of telematics unit 30 theft and to support remedial actions on the part of remote facility 80. One or more aspects of telematics disconnection detection method 200 may be completed through vehicle telematics unit 30 which may include one or more executable instructions incorporated into memory device 38 and carried out by processor 36 (controller). One or more ancillary aspects of method 200 may otherwise, for example, be completed through remote facility 80 which may include one or more executable instructions incorporated into databases 84 and carried out by server 82.

Method 200 is supported by telematics unit 30 being configured to establish one or more communication protocols with remote facility 80. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 38).

Method 200 begins at 201 in which the vehicle 12 is put in the compromised position of having one or more thieves entering the vehicle cabin with the intention of removing and stealing at least the telematics unit 30. Moreover, method 200 begins at 201 having the hardwire connection between telematics unit 30 and communication bus 58 severed (e.g., by being snipped). In step 210, after some amount of time, telematics unit 30 will sense that it has stopped receiving periodic heartbeat signals from one or more of the other VSMs 28 and thus conclude that the telematics unit 30 is no longer properly connected to the communication bus 58. In step 220, telematics unit 30 will determine whether it is still receiving power from the battery 41. This determination may occur when the telematics unit 30 senses whether it is still receiving the periodic heartbeat signals from the battery 41, or when the telematics unit 30 tests its connection with battery 41, or when telematics unit 30 recognizes that it has begun or has to begin working off of the backup battery 29, or by some other determination technique. In furtherance, when telematics unit 30 determines its connection to battery 41 has been severed, method 200 will move to step 230, since this can be a strong indication that the telematics unit 30 has been criminally disconnected/removed from the rest of vehicle 12. Method 200 will otherwise move to completion 202 because a disconnection between the communications bus 58 but a connection remaining with the vehicle's power source will not generally indicate the unwanted criminal disconnection/removal of the telematics unit 30 from vehicle 12.

In step 230, working off the backup battery 29 and in response to the disconnection event, telematics unit 30 will begin tracking its location through its integrated GNSS receiver 22. This location data may also be saved to the memory 38. In optional step 240, in further response to the disconnection event, using the cellular chipset 34, and integrated backup antenna 37, telematics unit 30 will transmit the location data to remote facility 80. This will allow remote facility 80 to know the location of the telematics unit 30. In optional step 250, in even further response to the disconnection event, using the cellular chipset 34, and integrated backup antenna 37, telematic unit 30 will also transmit a theft alert to the remote facility 80. Theft alerts are known to let the remote facility 80 verify that the removed telematics unit 30 has been stolen from vehicle 12. The theft alert may also cause remote facility 80 to know to contact the authorities (e.g., police) about the location of a stolen telematics unit 30 (so that the authorities may track the stolen telematics unit 30 and, when the device is not completely removed from it, the stolen vehicle 12). The theft alert may also cause remote facility 80 to know to contact the owner of the vehicle 12 (e.g., via their smart phone) to inform them of the theft issue. After step 250, method 200 moves to completion 202, where it may turn off backup battery 29 and completely power down so as to appear to be fully disabled from operation.

Figure 3:
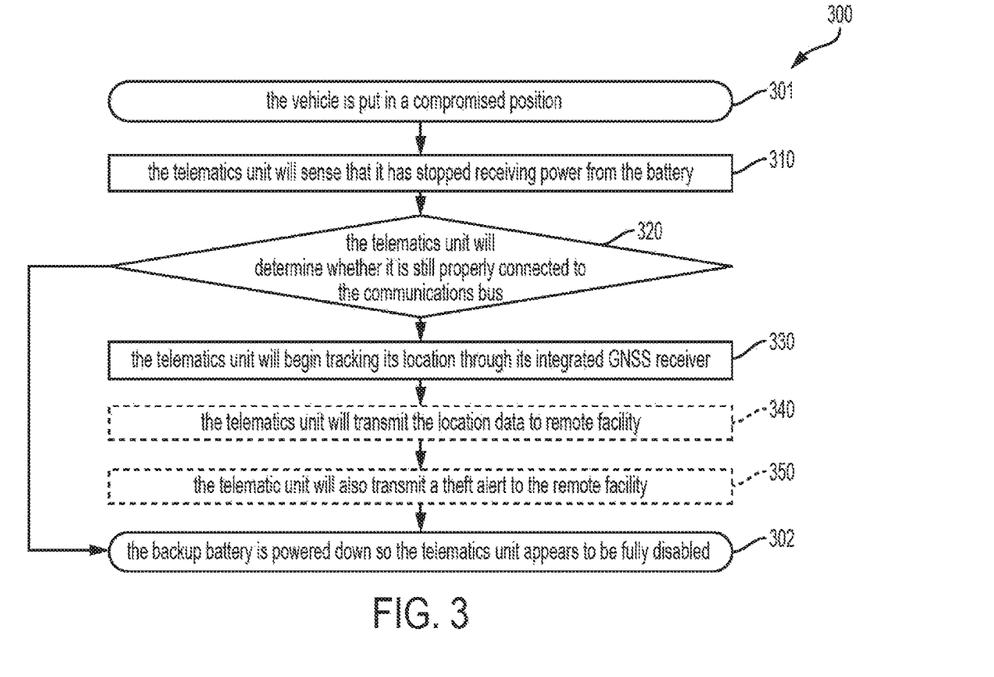
FIG. 3 is a flowchart of another process for detecting telematics unit removal, in accordance with exemplary embodiments.

Now turning to FIG. 3, there is shown another embodiment of a method 300 to detect an instance of telematics unit 30 disconnection for the purposes of indicating the occurrence of telematics unit 30 theft and to support remedial actions on the part of remote facility 80. One or more aspects of telematics disconnection detection method 300 may be completed through vehicle telematics unit 30 which may include one or more executable instructions incorporated into memory device 38 and carried out by processor 36 (controller). One or more ancillary aspects of method 300 may otherwise, for example, be completed through remote facility 80 which may include one or more executable instructions incorporated into databases 84 and carried out by server 82.

Method 300 is supported by telematics unit 30 being configured to establish one or more communication protocols with remote facility 80. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 38).

Method 300 begins at 301 in which the vehicle 12 is put in the compromised position of having one or more thieves entering the vehicle cabin with the intention of removing and stealing at least the telematics unit 30. Moreover, method 300 begins at 301 having the hardwire connection between telematics unit 30 and battery 41 severed. In step 310, after some amount of time, telematics unit 30 will sense that it has stopped receiving power from the battery 41. This may occur when the telematics unit 30 senses that it is also no longer receiving the periodic heartbeat signals from the battery 41, when the telematics unit 30 tests its connection with battery 41, or when telematics unit 30 recognizes that it has begun or has to begin working off of the backup battery 29. In step 320, telematics unit 30 will determine whether it is still properly connected to the communication bus 58. In order to do so, telematics unit 30 may wait to see if it receives one or more periodic heartbeats from any other VSM 28 or telematics unit 30 may send out a beacon test to see if it still connected to any other VSM 28. In furtherance, when telematics unit 30 determines its connection to communication bus 58 has been severed, method 300 will move to step 330, since this is a strong indication that the telematics unit 30 has been criminally disconnected/removed from the rest of vehicle 12. Method 300 will otherwise move to completion 302 because a disconnection with the battery 41 but a connection remaining with communication bus 58 will not generally indicate the criminal disconnection/removal of the telematics unit 30 from vehicle 12 (e.g., it may indicate the swapping out of battery 41, however).

In step 330, working off the backup battery 29 and in response to this type of disconnection event, telematics unit 30 will begin tracking its location through its integrated GNSS receiver 22. This location data may also be saved to the memory 38. In optional step 340, in further response to this disconnection event, using the cellular chipset 34, and integrated backup antenna 37, telematics unit 30 will transmit the location data to remote facility 80. This will allow remote facility 80 to know the location of the telematics unit 30. In optional step 350, in even further response to this disconnection event, using the cellular chipset 34, and integrated backup antenna 37, telematic unit 30 will also transmit a theft alert to the remote facility 80. After step 350, method 300 moves to completion 302, where it may turn off backup battery 29 and completely power down so as to appear to be fully disabled from operation.

Figure 4:
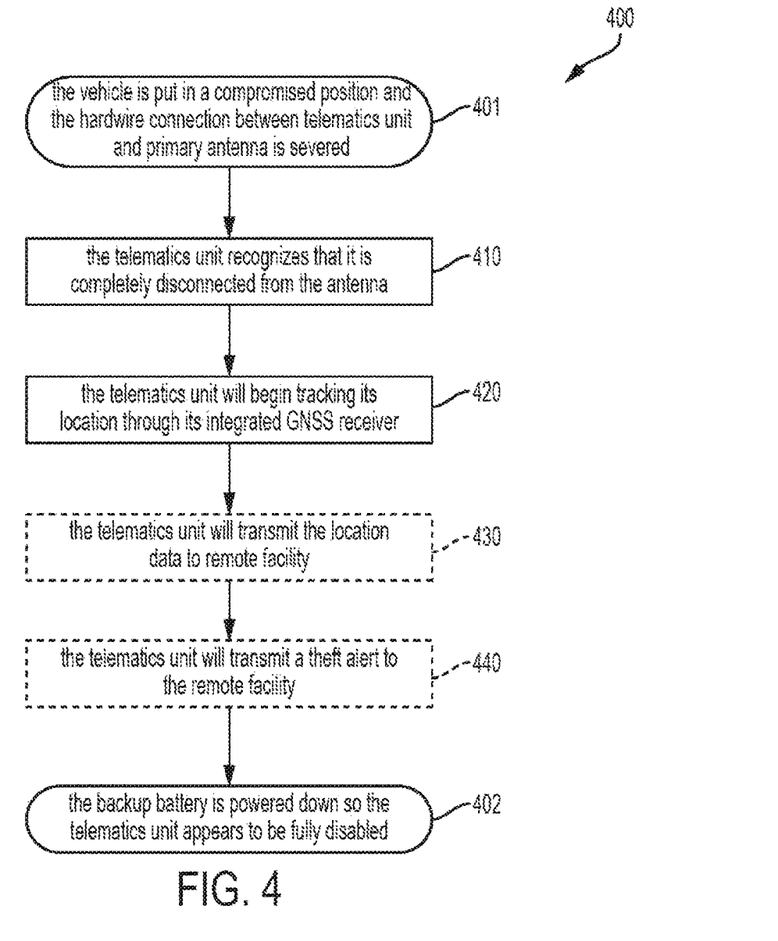
FIG. 4 is a flowchart of another process for detecting telematics unit removal, in accordance with exemplary embodiments.

Now turning to FIG. 4, there is shown another embodiment of a method 400 to detect an instance of telematics unit 30 disconnection for the purposes of indicating the occurrence of telematics unit 30 theft and to support remedial actions on the part of remote facility 80. One or more aspects of telematics disconnection detection method 400 may be completed through vehicle telematics unit 30 which may include one or more executable instructions incorporated into memory device 38 and carried out by processor 36 (controller). One or more ancillary aspects of method 400 may otherwise, for example, be completed through remote facility 80 which may include one or more executable instructions incorporated into databases 84 and carried out by server 82.

Method 400 is supported by telematics unit 30 being configured to establish one or more communication protocols with remote facility 80. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., memory device 38).

Method 400 begins at 401 in which the vehicle 12 is put in the compromised position of having one or more thieves entering the vehicle cabin with the intention of removing and stealing at least the telematics unit 30. Moreover, method 400 begins at 401 having the hardwire connection between telematics unit 30 and primary antenna 45 being severed. Method 400 may alternatively begin at 401 having the hardwire connection between telematics unit 30 and communication bus 58 being severed. Alternatively, method 400 may begin at 401 having the hardwire connection between telematics unit 30 and battery 41 being severed. In step 410, after some predetermined set amount of time (e.g., 5 minutes, 10 minutes, 30 minutes, 90 minutes etc.), telematics unit 30 will recognize that it is completely disconnected from the antenna 45 (e.g., after failing to transmit data to remote facility 80), communications bus 58, or battery 41.

In step 420, in response to this type of disconnection event, telematics unit 30 will begin tracking its location through its integrated GNSS receiver 22. This location data may also be saved to the memory 38. In optional step 430, in response to recognizing this disconnection event, using the cellular chipset 34, and integrated backup antenna 37, telematics unit 30 will transmit the location data to remote facility 80. This will allow remote facility 80 to know the location of the telematics unit 30. In optional step 440, in further response to this disconnection event, using the cellular chipset 34, and integrated backup antenna 37, telematic unit 30 will also transmit a theft alert to the remote facility 80. After step 440, method 400 moves to completion 402, where it may turn off backup battery 29 and completely power down so as to appear to be fully disabled from operation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to detect a vehicle system module (VSM) disconnection, the system comprising:
   a memory configured to comprise a program and a processor configured to execute the program, wherein the program enables the processor to:
   sense a disconnection event, wherein the disconnection event is a hardwire connection between the VSM and a communication bus being severed, wherein the disconnection event is sensed when the VSM has stopped receiving periodic heartbeat signals from one or more other VSMs through the communications bus; and
   in response to the disconnection event being sensed, gather VSM location data.

2. The system of claim 1, wherein the program further enables the processor to, in response to the disconnection event being sensed, transmit the VSM location data to a remote facility.

3. The system of claim 1, wherein the program further enables the processor to, in response to the disconnection event being sensed, transmit a theft alert to a remote facility.

4. The system of claim 1, wherein the VSM is a telematics unit.

5. The system of claim 1, wherein the program further enables the processor to:
   determine whether the VSM is disconnected from a vehicle power source; and
   gather VSM location data in response to both the disconnection event being sensed and when it has been determined that the VSM is disconnected from the vehicle power source.

6. The system of claim 5, wherein the program further enables the processor to transmit both the VSM location data and a theft alert to a remote facility in response to both the disconnection event being sensed and when it has been determined that the VSM is disconnected from the vehicle power source.

7. A telematics unit comprising:
   a memory configured to comprise a program and a processor configured to execute the program, wherein the program enables the processor to:

sense a disconnection event, wherein the disconnection event is a hardwire connection between the telematics unit and a communication bus being severed, wherein the disconnection event is sensed after the telematics unit sends out a beacon test configured to indicate whether the telematics unit is still hardwired to one or more vehicle system modules (VSM); and in response to the disconnection event being sensed:
gather telematics unit location data;
transmit the location data to a remote facility; and
transmit a theft alert to a remote facility.

8. The telematics unit of claim 7, further comprising:
a backup battery and backup antenna;
wherein the location data and the theft alert are transmitted to the remote facility via the backup antenna; and
wherein telematics power is provided after the disconnection event via the backup battery.

9. The telematics unit of claim 7, wherein the program further enables the processor to:
determine whether the telematics unit is disconnected from a vehicle power source; and
gather telematics unit location data, transmit the location data to a remote facility, and transmit a theft alert to the remote facility in response to both the disconnection event being sensed and when it has been determined that the telematics unit is disconnected from the vehicle power source.

10. A method to detect a vehicle system module (VSM) disconnection, the method comprising:
sensing, via a processor, a disconnection event, wherein the disconnection event is a hardwire connection between the VSM and a primary antenna being severed, wherein the disconnection event is sensed after the VSM fails to transmit data to a remote facility; and
in response to the disconnection event being sensed, via the processor, gathering telematics unit location data.

11. The method of claim 10, further comprising in response to the disconnection event being sensed, via the processor, transmitting the location data to a remote facility.

12. The method of claim 10 further comprising in response to the disconnection event being sensed, via the processor, transmitting a theft alert to a remote facility.

* * * * *